US 11,685,479 B2

(12) United States Patent
Rikoski

(10) Patent No.: US 11,685,479 B2
(45) Date of Patent: Jun. 27, 2023

(54) INCREMENTAL DEPLOYMENT OF A BUOY OR BUOY NETWORK

(71) Applicant: Hadal, Inc., Oakland, CA (US)

(72) Inventor: Richard J. Rikoski, Alameda, CA (US)

(73) Assignee: Hadal, Inc., Oakland, CA (US)

( * ) Notice: Subject to any disclaimer, the term of this patent is extended or adjusted under 35 U.S.C. 154(b) by 288 days.

(21) Appl. No.: 17/088,164

(22) Filed: Nov. 3, 2020

(65) Prior Publication Data

US 2021/0070401 A1 Mar. 11, 2021

Related U.S. Application Data

(63) Continuation of application No. 16/238,814, filed on Jan. 3, 2019, now Pat. No. 10,822,058.

(60) Provisional application No. 62/613,291, filed on Jan. 3, 2018.

(51) Int. Cl.
| | |
|---|---|
| *B63B 22/04* | (2006.01) |
| *B63B 22/00* | (2006.01) |
| *B63B 22/02* | (2006.01) |
| *B63B 22/16* | (2006.01) |
| *B64C 39/02* | (2023.01) |
| *B63B 35/38* | (2006.01) |
| *B63B 73/00* | (2020.01) |
| *B64U 101/60* | (2023.01) |

(52) U.S. Cl.
CPC ............ *B63B 22/04* (2013.01); *B63B 22/003* (2013.01); *B63B 22/02* (2013.01); *B63B 22/16* (2013.01); *B63B 35/38* (2013.01); *B63B 73/00* (2020.01); *B64C 39/024* (2013.01); *B63B 2241/28* (2013.01); *B64U 2101/60* (2023.01)

(58) Field of Classification Search
CPC ....... B63B 22/04; B63B 22/003; B63B 22/02; B63B 22/16; B63B 73/00; B63B 35/38; B63B 2241/28; B63B 22/00; B64C 39/024; B64C 2201/128; B64C 39/02; B64U 2101/60
See application file for complete search history.

(56) References Cited

U.S. PATENT DOCUMENTS

| | | | |
|---|---|---|---|
| 3,878,576 A * | 4/1975 | Suyderhoud | ............ B63B 22/16 441/6 |
| 5,606,929 A | 3/1997 | Huang | |
| 7,455,561 B1 * | 11/2008 | Tuttle | ...................... B63B 22/16 441/6 |
| 2006/0159524 A1 | 7/2006 | Thompson et al. | |

(Continued)

FOREIGN PATENT DOCUMENTS

WO 2004024555 A1 3/2004

*Primary Examiner* — Stephen P Avila
(74) *Attorney, Agent, or Firm* — Burns & Levinson LLP; Christopher Carroll

(57) ABSTRACT

A mooring system including a plurality of connected floats and weights being positively buoyant on a water surface and being negatively buoyant at a depth below the water surface. The mooring system also includes a trigger mechanism arranged to reduce the buoyancy of a portion of the connected floats and weights from a being positively buoyant to negatively buoyant to cause the portion of the connected floats and weights to sink below the water surface where the trigger mechanism changes the buoyance of the portion of the connected floats and weights by either adding a weight to one end or separating the end from a buoyant element.

16 Claims, 7 Drawing Sheets

(56) References Cited

U.S. PATENT DOCUMENTS

| | | |
|---|---|---|
| 2011/0186301 A1 | 8/2011 | Childers et al. |
| 2011/0274501 A1 | 11/2011 | Remery et al. |
| 2013/0309020 A1 | 11/2013 | Tomas et al. |
| 2017/0349245 A1 | 12/2017 | Yamashita |

* cited by examiner

INCREMENTAL DEPLOYMENT OF A BUOY OR BUOY NETWORK

REFERENCE TO RELATED APPLICATIONS

This application is a continuation of U.S. patent application Ser. No. 16/238,814, filed on Jan. 3, 2019, which claims priority to and the benefit of U.S. Provisional Patent Application No. 62/613,291, filed on Jan. 3, 2018, and entitled "Incremental Deployment of a Buoy and/or Buoy Network." The entire contents of the above-referenced applications are incorporated herein by reference.

BACKGROUND

A buoy is a device configured to float within a body of water such as an ocean. A buoy can perform various objectives including functioning as a sea mark, lifebuoy, a submarine communications buoy, a DAN buoy, navigational buoy, Sonobuoy, surface marker buoy, decompression buoy, shot buoy, weather buoy, Tsunami buoy, wave buoy, and so on. A buoy can be anchored (tethered) or allowed to drift within a body of water. Various techniques are known for deploying buoys. However, there is a need for enabling more efficient, timely, and less costly deployment of buoys.

SUMMARY

Systems and methods are disclosed herein for more efficiently deploying one or more buoys. In one aspect, a buoy is arranged in multiple sections or modules that are connectable to one or more other modules of a buoy. The sections and/or modules may be configured and/or sized (and/or weighted) so as to enable a delivery vehicle, such as an unmanned aerial vehicle (UAV) to carry each section to a destination location for assembly of the buoy at the destination location. Other types of delivery vehicles or device may be used such as, without limitation, a land-based vehicle (e.g., an autonomous automobile or robot) or a marine based vehicle (e.g., a AUV). In the instance of a water-based buoy, the delivery device may include multiple mode of movement including a combination of two or more of land, water, and air mobility features or propulsion systems. In this way, a buoy may be rapidly deployed at a relatively long distance over a body of water (or over a body of land, or both) by delivering and assembling various sections, modules, and components at a desired location. A buoy may be assembled to include a vehicle tether such as a platform to enable a UAV, drone, or other aerial vehicle to land on the buoy. The buoy may include a power generator and/or energy store to power functions of the buoy. The buoy may also include a power interface configured to provide power to an UAV, drone, aerial vehicle, or water-born vehicle (e.g., a boat, underwater vehicle (e.g., AUV), unmanned surface vehicle (USV), and so on). Hence, in certain implementations, a network of buoys may incrementally propagate from one or more previously deployed buoys. For instance, once one buoy is deployed and assembled, and operational, then one or more UAVs will be able to land and recharge (or refuel) at the buoy. Parts, modules, and/or sections for additional buoys may be stored by the first buoy. Hence, a recharged UAV may delivery parts to a new location for assembly of a new buoy, and so on, enabling the propagations of buoys throughout a region or area of ocean and/or land.

In certain aspects, assembly of a buoy is performed autonomously by one or more UAVs. In some implementations, one or more modules are configured to sense and/or detect the presence of another module and perform an attachment and/or engagement to the one or more other modules. In some implementations, an assembly robot, vehicle, or system may be positioned at a designated location for a buoy and assemble the buoy as modules are delivered by one or more UAVs. This would advantageously reduce the power consumption of the assembly vehicle by eliminating or reducing a need for the vehicle to carry buoy components.

In some implementations, a buoy includes a mooring system having a tethering line and mooring element, weight, and/or anchor element. The tethering line may be delivered to a buoy in one or more sections. The tethering line may be configured to include one or more buoyancy elements. Each buoyancy element may be configured to become negatively buoyant at a designated depth within a body of water such as sea water or fresh water. In one implementation, a buoyancy element includes a bladder configured to collapse at a particular depth within ocean water. As the bladder collapses, the density of the bladder increases, causing the bladder to become negatively buoyant and, thereby, causing the bladder along with adjacent elements along a tethering line to sink as well. By including a series of bladders spaced along a tethering line, a relatively light weight and buoyant tethering line may be staged on the ocean surface next to a buoy. One or more sections of the tethering line may be delivered to the buoy by an UAV Other delivery devices may be utilized such as an AUV, underwater drone, surface water vehicle, USV, and/or surface water drone. Once the tethering line is connected to and staged next to a buoy, a mooring element (e.g., a weight or anchor) may be attached to the free end of the tethering line. Once attached, the mooring element or weight (being negatively buoyant) begins to sink and pull the tethering line downward and, thereby, pull an adjacent bladder downward until the adjacent bladder collapses to become negatively buoyant which, in turn, pulls the tethering line further downward until the next bladder reaches a depth to which it collapses, and so on, until the tethering line and mooring weight sink to the ocean floor. Such a mooring system advantageously enables delivery of a relatively light weight tethering system via one or more UAVs, having relatively limited lift capacity, to a buoy, while enabling subsequent deployment of the tethering line and mooring weight or anchor so as to anchor a buoy to a particular location. In some instances, multiple trips may be performed to pre-stage one or more components of the buoy on the surface of the water before sinking the mooring weight and/or anchor.

In one aspect, a plurality of buoys is incrementally or sequentially deployed by propagating the deployment and/or remote assembly of a second buoy from a first buoy, and so on. The process can be repeated continuously until a network of buoys is deployed over a desired geographic region. Once a buoy is deployed and/or assembled, and becomes operational, the buoy may become a launch point for deploying and assembling the next buoy at a further location. Once a network of buoys is deployed, with each buoy having a platform arranged to enable landing of one or more UAVs, and each buoy providing a power source to recharge or refuel an UAV, the network of buoys may be configured to provide a long range delivery bridge, enabling UAVs to extent their range multiple times, enabling long range delivery of items over vast geographic distances, via selected and possibly less obtrusive routes. A UAV may include a drone and/or a quadcopter. In certain implementations, a mooring and/or anchor chain is configured to be positively buoyant on the surface while being negatively buoyant below or surface or on the seabed, but can be triggered to sink below the water surface with a very small weight and/or addition of weight.

In one aspect, a modular buoy deployment system includes a plurality of modules arranged to be assembled at a destination location where each of the plurality of modules is connectable to at least one other module of the plurality of modules. The plurality of modules form a buoy when assembled. The system includes one or more assemblers arranged to position a portion of the plurality of modules at the destination location to form an assembled buoy. The system further includes a delivery apparatus arranged to deliver the plurality of buoy modules to the destination location where the delivery of each of the plurality of modules conforms to a delivery criteria of the delivery apparatus.

In some implementations, the buoy includes a platform arranged to receive one or more delivery apparatuses. The buoy may include a power system arranged to recharge the delivery apparatus. The delivery apparatus may include at least one of an aerial delivery device, a marine delivery device, and a land-based delivery device. The delivery device may include at least one of an UAV, AUV, and USV. In some configurations, each of the plurality of modules is configured to detect at least one other module of the plurality of modules. Each of the plurality of modules may be configured to attach to the detected at least one other module of the plurality of modules. In some implementations, the delivery apparatus includes the one or more assemblers and is configured to assemble a buoy autonomously. The assembler may include an assembly robot.

In another aspect, a modular unmanned aerial vehicle terminal includes a plurality of modules that are assembled at a destination location where each of the plurality of modules is connected to at least one other module of the plurality of modules. Each of the plurality of modules may be transportable by an unmanned aerial vehicle (UAV). The terminal includes a platform having one or more of the plurality of modules arranged to receive the UAV. The terminal also includes a power source having one or more of the plurality of modules arranged to charge a battery of the UAV.

In some implementations, each of the plurality of modules is configured to detect at least one other module of the plurality of modules and each of the plurality of modules is configured to attach to the detected at least one other module of the plurality of modules. The terminal may include an assembly system at the destination location configured to assemble the buoy autonomously. The assembly system may include an assembly robot. Each of the plurality of modules may be sized to enable the UAV to carry each module. The power source may include a power generator and an energy store. The power source may include a liquid, power cell, or gas powered electrical generator. The energy store may include at least one of a battery, fuel cell, liquid or gas storage tank. The terminal and/or buoy may include a fuel delivery interface to delivery fuel to a delivery device such as a UAV. The terminal may be at least one of water-based and land-based.

In another aspect, a method for deploying a network of UAV terminals includes: a) assembling a first plurality of modules at a first location to form a first UAV terminal where the first UAV terminal includes a platform arranged to receive one or more UAVs; b). deploying a first UAV from the platform of the first UAV terminal to a second location remote from the first location where the first UAV delivers one or more UAV terminal modules to the second location; and c) assembling a second plurality of modules at the second location to form a second UAV terminal where the second UAV terminal includes a platform arranged to receive one or more UAVs. Steps a-c may be repeated until a network of UAV terminals has been deployed across a geographic region where the second UAV terminal from a previous sequence of steps ac is designated as the first UAV terminal for next sequence of steps a-c.

In yet another aspect, a mooring composed of connected floats and weights that are positively buoyant on the sea surface, are negatively buoyant on the sea floor, and can be triggered to sink either adding a weight to one end or separating the end from something buoyant. In one implementation, a mooring system includes a plurality of connected floats and weights being positively buoyant on a water surface and being negatively buoyant at a depth below the water surface. The system includes a trigger mechanism arranged to reduce the buoyancy of a portion of the connected floats and weights from a being positively buoyant to negatively buoyant to cause the portion of the connected floats and weights to sink below the water surface. The buoyance of the portion of the connected floats and weights may be changed by either adding a weight to one end of the connected floats and weights or separating the end from a buoyant element. The depth below the water surface may include a depth at or about the sea floor or some intermediate depth between the water surface and water (or sea) floor. The trigger mechanism may include an assembler, assembly system, and/or robot configured to either add a weight to the end of the connected floats and weights or remove a buoyant element from the end. In some implementations, a buoy with or without its own propulsion system, USV, ASV (autonomous surface vehicle), and/or AUV (i.e., a marine device) is configured to deploy to a location on and/or below the ocean (or other water body) surface and use an included and/or embedded mooring system, as described herein, that deployed a mooring and/or anchor to hold device in a particular location. The marine device may include one or more of the components described with respect to FIG. 2 including a GPS, inertial, or other location system to determine the location for deploying the mooring and/or anchor.

Other objects, features, and advantages of the present invention will become apparent upon examining the following detailed description, taken in conjunction with the attached drawings.

BRIEF DESCRIPTION OF THE DRAWINGS

The systems and methods described herein are set forth in the appended claims. However, for purpose of explanation, several illustrative aspects are set forth in the following figures.

DESCRIPTION

To provide an overall understanding of the invention, certain illustrative aspects will now be described. However, it will be understood by one or ordinary skill in the art that the systems and methods described herein can be adapted and modified for other suitable applications and that such other additions and modifications will not depart from the scope hereof Systems and methods are described herein directed towards incrementally deployable buoys and/or buoy networks.

Figure 1:
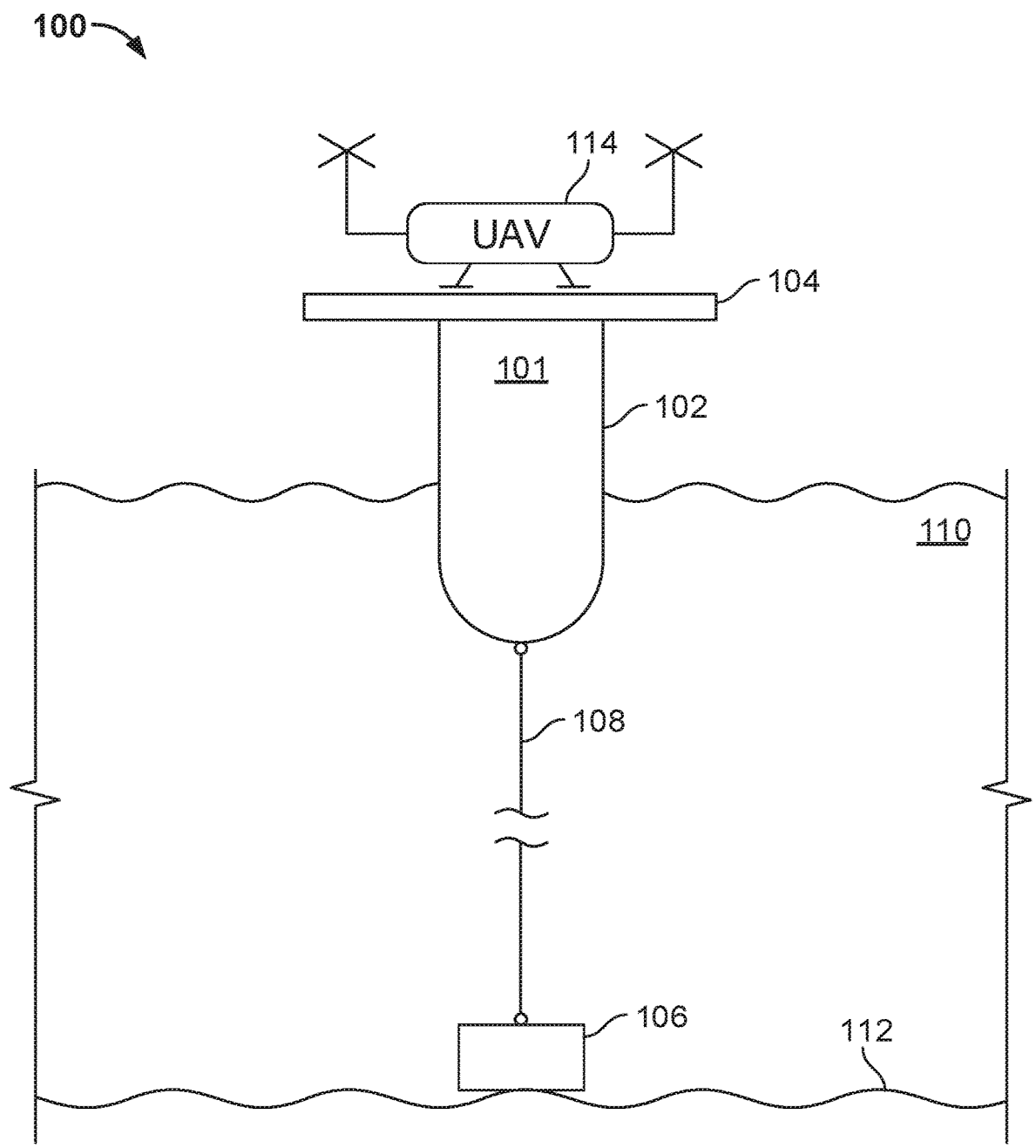
FIG. 1 is a diagram depicting an exemplary buoy including a platform enabling UAV landings.

FIG. 1 is a diagram 100 depicting an exemplary buoy 101 including a platform 104 enabling UAV 114 landings. The buoy 101 may include a housing 102, tethering line 108 and a mooring element 106. Once deployed, the mooring element 106 may rest on a sea floor 112. The buoy 101 may be positioned (i.e., floating) with a water body 110, e.g., an ocean. The platform 104 may be configured to support one or more UAVs 114 and/or other aerial vehicles. As explained later herein, the buoy 101 may include a power generator capable of recharging a UAV 114, via an attachable/removable electrical/mechanical connection or via inductive wireless (proximity) charging. The UAVs 114 may be a quadcopter. The size, range, and lift capacity of the UAV 114 may vary. The size, range, and lift capacity may depend on the size of the platform 104 and power delivery capacity of the buoy 101. In some implementations, the buoy 101 may be untethered. In some implementations, the buoy 101 may include a propulsion system. The buoy 101 and/or buoy housing 102, along with various buoy components may be configured to be detachably connectable to enable delivery of sections, components, and/or modules to a destination location for assembly and deployment of a buoy 101. In this way, one or more UAVs 114 may be configured to deliver relatively lighter weight sections (i.e., sections within the lift/range tolerance of a UAV 114) for subsequent assembly as the destination. The delivery of each of a plurality of modules may conform to a delivery criteria of an aerial delivery apparatus. For example, certain modules may be delivered in a predetermined sequence. For example, a power generation module 206, a mooring module 202, an assembler 220, and/or a propulsion module 204 may be delivered first or early in a sequence to enable the buoy 101 to maintain a more stable position before other modules are delivered and assembled or combined with previously delivered modules. In a situation where an initial determination of environmental conditions has a higher priority, the sensor module 210 and/or communications module 208 may be delivered first or early in the delivery sequence. Hence, a delivery criteria including a sequence of delivery and/or assembly of buoy 101 modules may depend on environmental conditions, tactical conditions, power requirements, payload carrying capabilities of UAVs, and so on. The assembler may be detachable and re-connectable to a delivery device, such as a UAV. In some instances, a UAV may deploy an assembler at a destination location to enable assembly of modules, leave the destination location to obtain additional modules, and then return with additional modules. At some time after assembly of a buoy is completed, the assembler would be reconnected with the delivery device. In this way, the same assembler may be used to assemble multiple buoys and/or terminals. Also, by detaching the assembler during assembly, a delivery device may utilize less power while handling deliveries of other modules.

Figure 2:
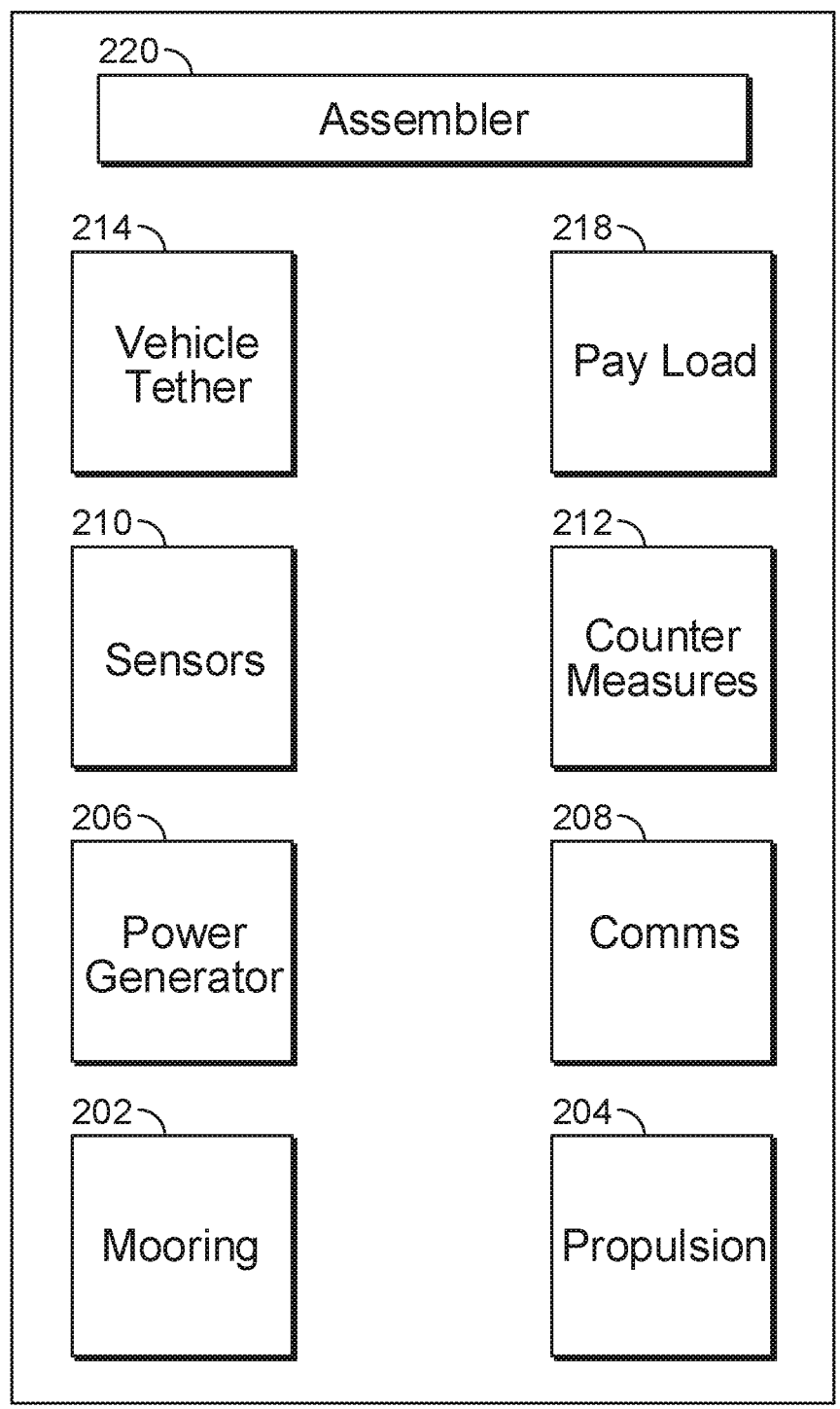
FIG. 2 is block diagram of exemplary functional elements of a buoy for implementing at least a portion of the systems and methods described in the present disclosure.

FIG. 2 is block diagram 200 of exemplary functional elements 202-218 of a buoy 101 for implementing at least a portion of the systems and methods described in the present disclosure. The buoy 101 may include a mooring system 202 configured to enable mooring of the buoy to the sea floor 112 via a tethering line 108 and mooring element 106. The buoy 101 may include propulsion element or system 204 configured to navigate the buoy 101. The propulsion system 204 may at least provide sufficient propulsion to counteract a current within the ocean. The propulsion system 204 may operate in response to a processor, GPS, and/or inertial navigation system to maintain the buoy 101 in designated location. The buoy 101 may include a power generator 206. The power generator 206 may include a solar panel, wind turbine, motion-based power generator, energy storage (one or more batteries, one or more fuel cells, liquid fuel), chemical reactor, and/or nuclear reactor, and so on. The power generator may include a charge and/or discharge controller (processor) to control energy storage and charging of, for example, batteries or to control discharge of the batteries during charging of another device such as a UAV 114.

The buoy 101 may include a communications system 208 to enable the buoy 101 to send and receive data to one or more other buoys, ships, vehicles, underwater vehicles, servers, satellites, and/or land-based networks. The exemplary system 200 may includes a processor, a memory, and an interconnect bus. The processor may include a single microprocessor or a plurality of microprocessors for configuring computer system as a multi-processor system. The memory illustratively includes a main memory and a read-only memory. The system 200 may also include the mass storage device having, for example, various disk drives, tape drives, etc. The main memory also includes dynamic random access memory (DRAM) and high-speed cache memory. In operation and use, the main memory stores at least portions of instructions for execution by the processor when processing data (e.g., model of the terrain) stored in main memory.

In some aspects, the system 200 may also include one or more input/output interfaces for communications, shown by way of example, as an interface for data communications via data communications system 208. The data interface may be a modem, an Ethernet card or any other suitable data communications device. The data interface may provide a relatively high-speed link to a network, such as an intranet, internet, or the Internet, either directly or through another external interface. The communication link to the network may be, for example, any suitable link such as an optical, acoustic, and/or wireless (e.g., via satellite, Microwave, or 802.11 Wi-Fi or cellular network) link. In some aspects, communications may occur over an acoustic modem. For instance, for communication with AUVs or other underwater vehicles, communications may occur over such a modem. Alternatively, the system 200 may include a mainframe or other type of host computer system capable of web-based communications via the network. In some aspects, the system 200 also includes suitable input/output ports via system 208 or may use an Interconnect Bus for interconnection with a local display and user interface (e.g., keyboard, mouse, touchscreen) or the like serving as a local user interface for programming and/or data entry, retrieval, or manipulation purposes. Alternatively, server operations personnel remotely may interact with the system 200 for controlling and/or programming the system from remote operations (not shown in the Figure) via the network.

In some aspects, the system 200 includes a processor, such as a navigational controller, sonar controller, radar control, data collection controller, and/or fire controller. Data corresponding to sensors may be stored in the memory or mass storage, and may be retrieved by the processor. The processor may execute instructions stored in these memory devices to perform any of the methods described in this application, e.g., data analysis, fire control, salinity analysis, wave monitoring, and so on.

The system may include a display for displaying information, a memory (e.g., ROM, RAM, flash, etc.) for storing at least a portion of the aforementioned data, and a mass storage device (e.g., solid-state drive) for storing at least a portion of the aforementioned data. Any set of the aforementioned components may be coupled to a network via an input/output (I/O) interface. Each of the aforementioned components may communicate via an interconnect bus.

The system 200 may include one or more sensors 210 configured to perform any number of operations. For instance sensors 210 may include active and/or passive radar, active and/or passive sonar, optical sensors, radio signal antenna and/or interceptors, chemical sensors (detect water composition), environment sensors, atmospheric sensors, inertial sensors, heat sensors, motion sensors, radiation sensors, and so on. The system 200 may include a countermeasures system 212. The countermeasures system 212 may be configured to provide anti-personnel, anti-ship, anti-submarine, and anti-aircraft functions. The countermeasures system 212 may include a processor (as discussed above) arranged to control a fire arm to protect the buoy 101 from interference by a diver or other persons. The system 212 may utilize one of more sensors to detect the presence of persons within proximity to the buoy 101 and, in response, engage the firearm and/or fire control system if necessary. The system 212 may include a fire control function to deploy a torpedo or rocket against a detected threat such as a surface or underwater vessel. The system 212 may deploy a rocket, laser, or other projectile against an aerial vehicle detected as a threat. The system 212 may provide detection information to system 208 to enable the buoy 101 to communication a warning of a detected threat as a possible early warning system. The system 212 may include a minigun or a quadcopter with a Claymore mine for pirate neutralization. The system 212 may include a vehicle tether system to enable the buoy 101 to tether with another vehicle such as a boat, ship, AUV, and/or UAV. For example, the platform 104 is a type of tethering feature by enabling an UAV to land on the buoy 101. The platform 104 may include an electrical/mechanical connection to hold a UAV in place after landing, which may be advantageous in rough seas. An UAV may exchange data with a buoy 101 via a wireless data connection such as 802.11 or Bluetooth once in proximity with the buoy 101. A UAV may utilize other types of wireless and/or RF communications to communicate with a buoy 101.

The system 200 may include payload storage 218. The payload storage 218 may store items such as modules for other buoys 101, items for delivery to other destinations, test equipment for deployment by the buoy, or ordinance (explosives). In some implementations, the buoy may function as an anti-ship or anti-submarine mine in which case the payload storage 218 may storage an explosive charge. The buoy 101 may be configured to submerge to a designated depth to perform certain tests or to function as an anti-ship or anti-submarine mine. The buoy 101 may be configured to surface in response to a received instruction or periodically.

In some implementations, the system 200 includes an assembler 220. The assembler 220 may be a distributed assembler enabling sections, modules, or components of the system 200 (e.g., buoy 101) to self-assemble into buoy 101. For example, a first module may include a first assembler element that detects a second module including a second assembler element. The first and second assembler elements may each include a mobility unit and attachment unit to enable the first and second units to physically connect with each other. The assembler 220 may include a robot configured to connect various sections of buoy 101. In such a configuration, the assembler 220 may include one or more robotic arms to enable the assembler 220 to connect at least two modules together.

Figure 3:
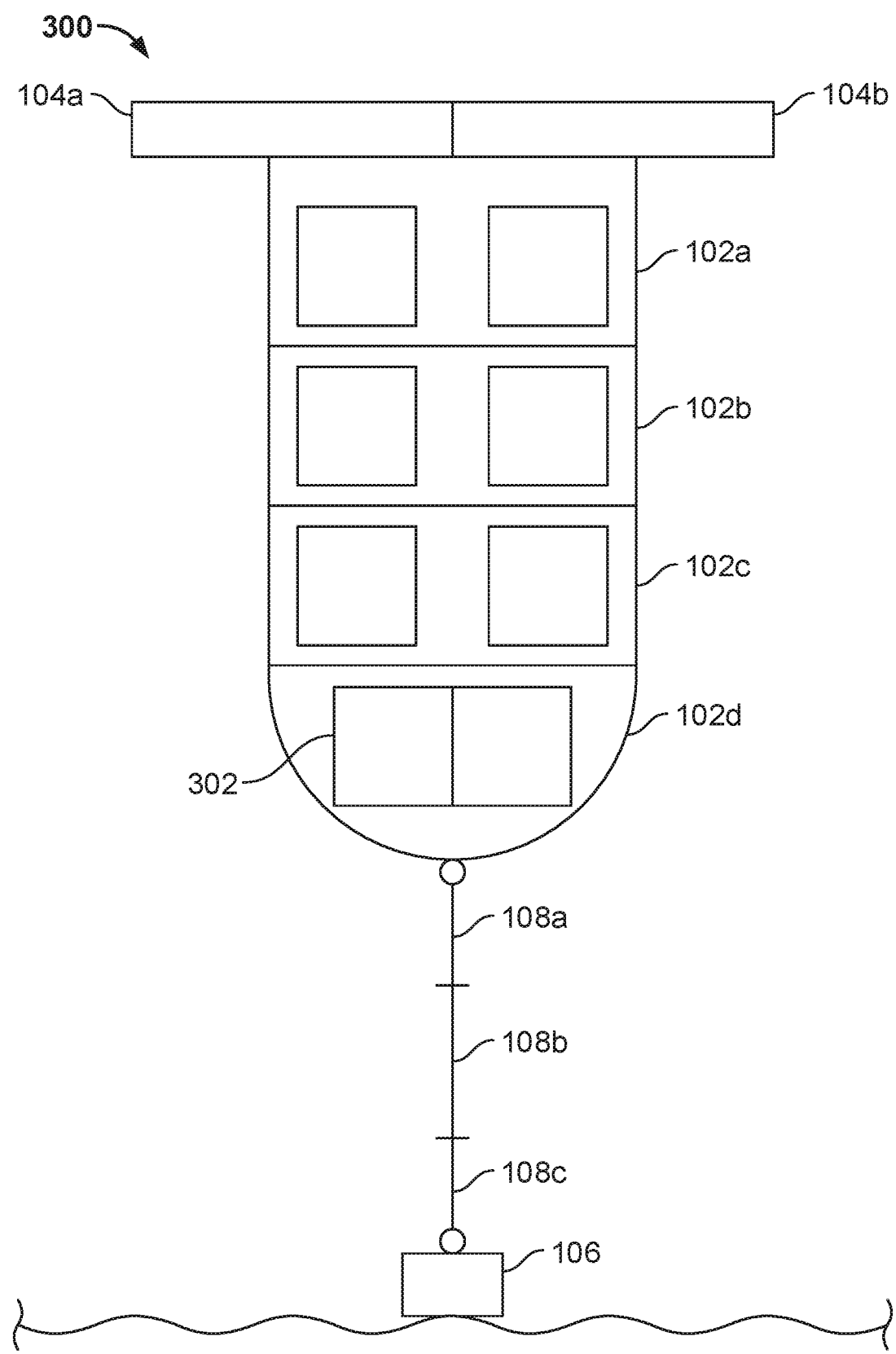
FIG. 3 depicts a modular or sectional buoy according to aspect of the present disclosure.

FIG. 3 depicts a modular or sectional buoy 300 according to aspect of the present disclosure. Each module may be delivered incrementally a destination and sequentially assembled. For example, a base element of housing 102 (e.g. 102$d$ of FIG. 3) may be delivered first by a first UAV 114. Then, a second portion of housing 102 (e.g., 102$c$) may be delivered to the destination. In one configuration, housing module 102$d$ includes a sensor (proximity and/or contact) that detects the presence of module 102$c$. The housing module 102$d$ may include an assembler 220, connected to the housing module 102$d$ that engages the module 102$c$ with the module 102$d$. Module 102$c$ may, in turn, include an assembler 220 engagement mechanism that engages module 102$b$ with module 102$c$ when detected. The process continues until all modules and/or sections of buoy 300 are assembled.

Alternatively, assembler 220 may be included as part of an assembler vehicle. The assembler vehicle may be deployed to a destination location. Once at the location, one or UAVs 114 delivery the modules for buoy 300. The assembler may include a platform or storage container to protect the modules during assembly of the buoy 300. This approach may be advantageous in rough seas. Once assembly is complete, the assembler vehicle launches the buoy at the destination and then moves to the next destination location. Another advantage of this technique is that the assembler vehicle saved power (and can be deployed longer) because it is required to transport buoy components to destinations. In addition to housing components, one or more UAVs may delivery modules 302 including functional elements 202-220. A tethering line 108 may also be delivered in sections 108$a$, 108$b$, and 108$c$, and be assembled by an assembler 220 and/or one more UAVs 114.

Figure 4A:
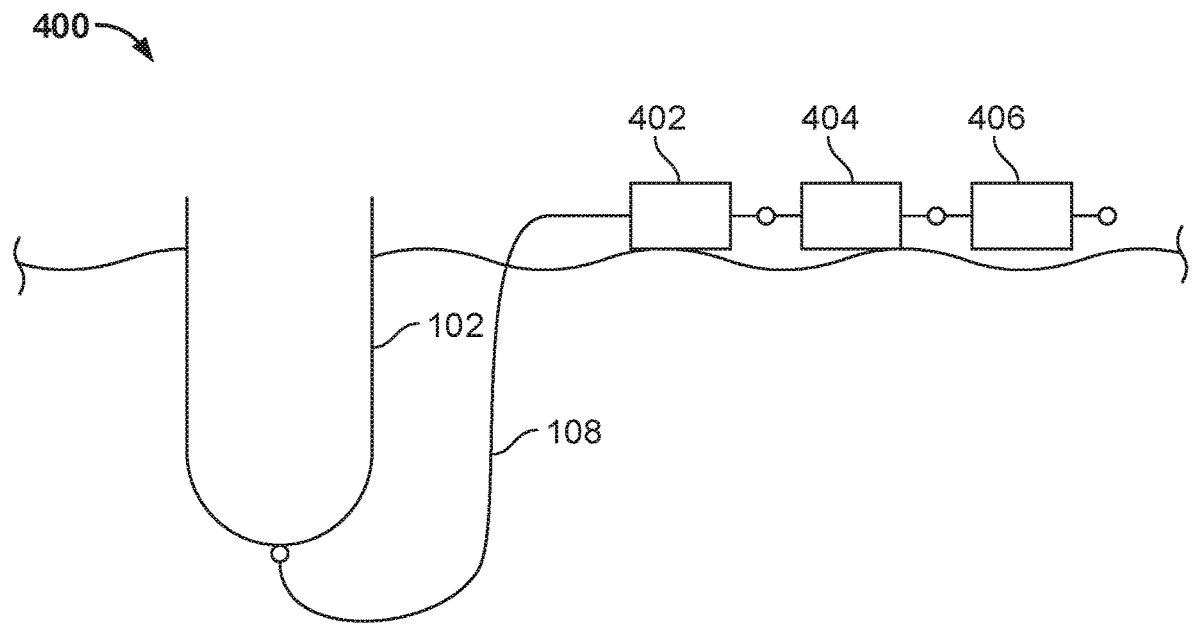
FIGS. 4A, 4B, and 4C depict a sequence associated with deploying a tethering line and mooring element.
Figure 4B:
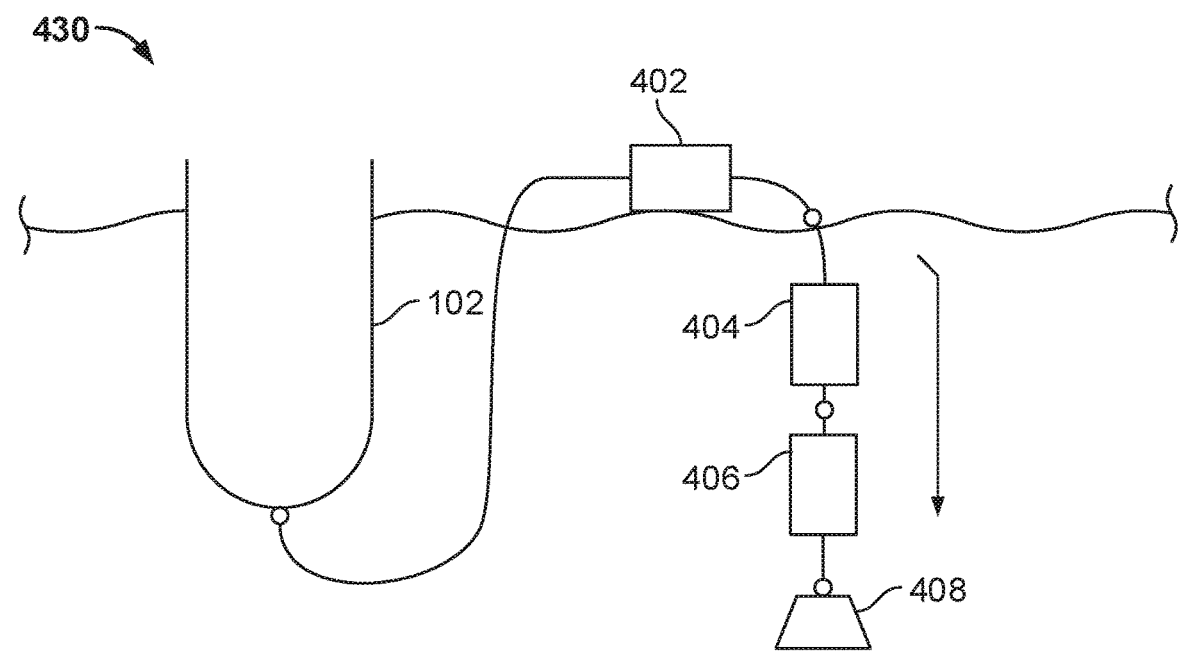
Figure 4C:
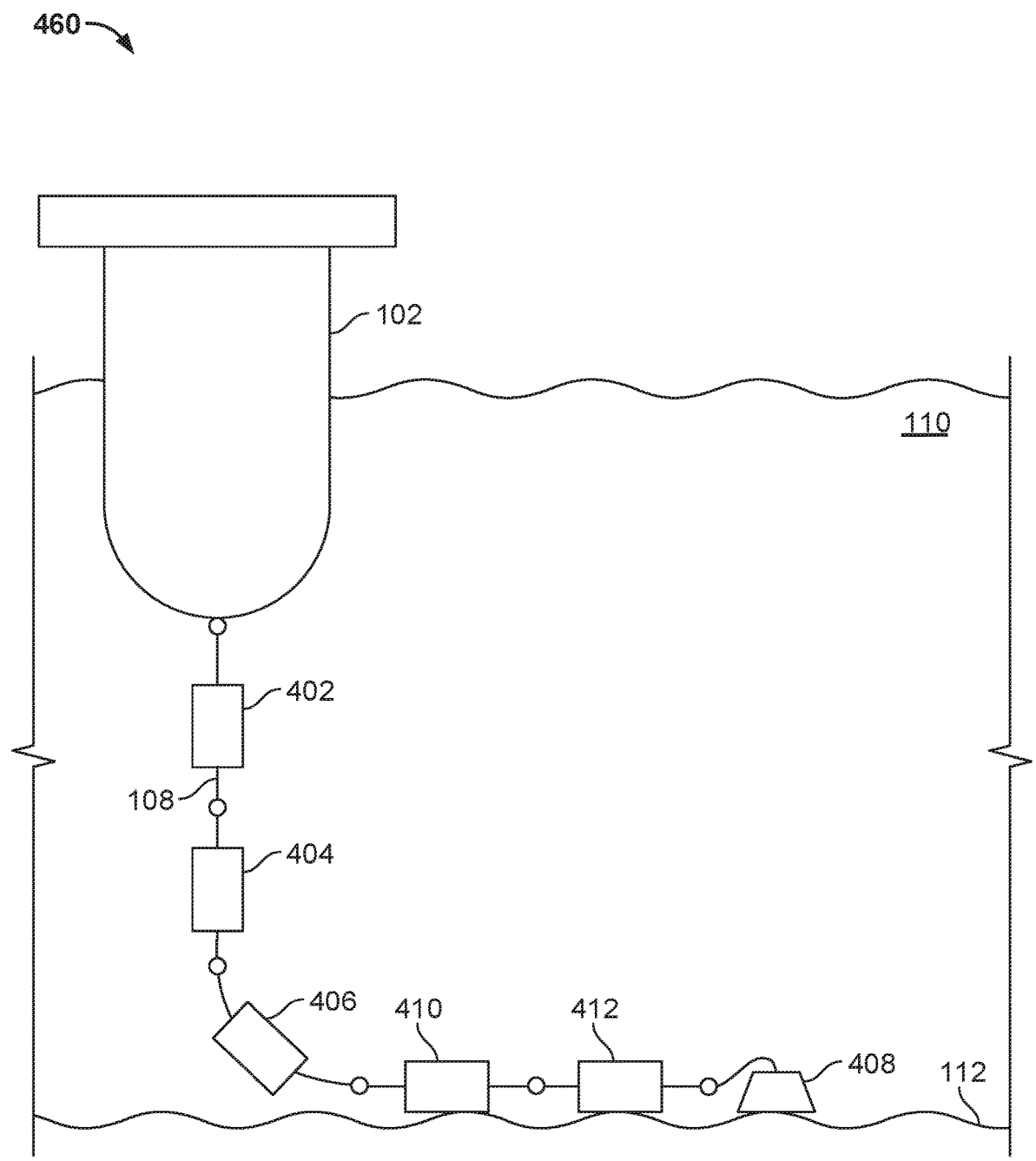

FIGS. 4A, 4B, and 4C depict a sequence associated with deploying a tethering line 108 and mooring element 408. FIG. 4A illustrates an initial deployment of a tethering line 108 including buoyancy elements 402, 404, and 406. The buoyancy elements may include an element that initially is positively buoyant, but under certain conditions, becomes negatively buoyant. In FIG. 4A, the buoyancy elements are positively buoyant and, thereby, float on the surface of a body of water. The buoyancy elements 402, 404, and 406 may include a bladder. In some instances, an UAV 114 may delivery one or more sections of a tethering line 108 to a buoy 101, which may be connected at the surface of the water by an assembler 220 and/or UAV 114. In some implementations, a bladder is less than or equal to about 0.5 Kg, 1 Kg, 1.5 Kg, 2 Kg, 5 Kg, and 10 Kg.

FIG. 4B illustrates how the tethering line 108 submersion process 400 is initiated by connecting a mooring element 106 and/or 408. The mooring element may include a metal and/or a material having a density greater than the surround water. The mooring element 106 and/or 408 may be less than or equal to about 0.5 Kg, 1 Kg, 1.5 Kg, 2 Kg, 5 Kg, 10 Kg, 50 Kg, 100 Kg, and 1000 Kg. For example, after the tethering line 108 is assembled on the surface, a 1 Kg mooring element 408 may be attached to the free end of the tethering line adjacent to buoyance element 406. As illustrated in FIG. 4B, the weight of the mooring element 408 pulls the tethering line 108 downward towards to bottom of the ocean. This action causes the buoyancy element 406 to sink downward, increasing the surrounding pressure on the buoyancy element 406 to, thereby, cause the bladder to collapse and its density to increase to a state of negative buoyancy. This creates a chain reaction of negative buoyance as each buoyancy element along the tethering line 108 is pulled downward and becomes negatively buoyant. FIG. 4C illustrates the resulting position 406 of the mooring element 408 and tethering line 108 after all of the buoyancy elements 402, 404, 406, 410, and 412 become negatively buoyant and sink. Hence, an initially buoyant and relative light weight tethering line 108 during delivery via one or more UAVs 114 is configured to be deployed submersibly and function as a mooring system for a buoy.

Figure 5:
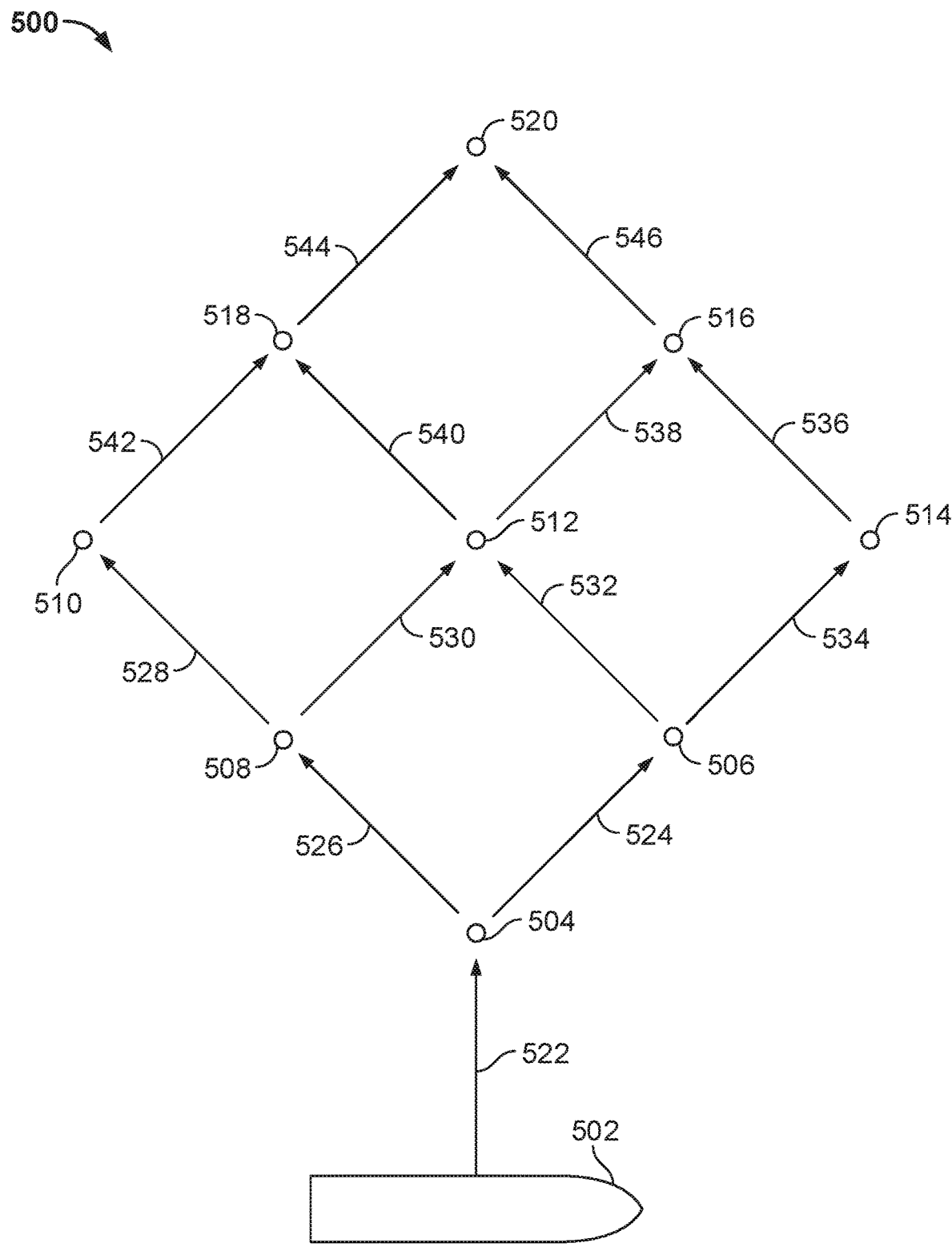
FIG. 5 depicts a diagram showing an arrangement of deployed buoys according to aspects of the present disclosure.

FIG. 5 depicts a diagram 500 showing an arrangement of deployed buoys 101 according to aspects of the present disclosure. FIG. 5 illustrates deployment of a network of buoys 504-520 from a ship 502. However, deployment may be initiated from land, ships, aerial vehicles, submarines, and/or a combination of sources. The arrows 524-546 illustrate possible deployment flights paths of UAVs 114 to destinations where buoys 504-520 may be located. However, the illustrated path may be travelled by UAVs 114 in either direction. FIG. 5 also illustrates how buoys can propagate from a source 502 to a first buoy 504 and then continue to propagate (be deployed incrementally) in multiple direction including to buoy 520. Such a propagation may enable deployment of a mine field in a geographic region, a submarine acoustic sensor array, an aerial defense (radar) array, a delivery bridge of items from one location to another, deployment of a cellular telephone network (where each buoy include a base station transceiver) over a body of water, and so on. Such a propagation process may be implemented in other environments such as in space and/or to deploy a terminal network on the surface of a planet, e.g., Mars or other body with non-water liquid bodies (e.g. the methane lakes of Titan).

In some implementations, the network of buoys 504-520 function as a transportation bridge of payloads from, for example, ship 502 to buoy 520. Each buoy may be configured to support landing and/or housing of two or more UAVs 114. Thus, a first UAV 114 may delivery a payload (e.g., module, package, or other item) from ship 502 to buoy 504. The payload may be transferred from the first UAV 114 to a second UAV 114 parked on the platform 104 where the second UAV 114 has been fully charged with power by buoy 504. The first UAV 114 may link with a power source of buoy 504 to recharge or refuel in anticipation of being used later. The second UAV 114 may then transport the payload from buoy 504 to buoy 506. The payload may then be transferred to a third UAV 114 that has been charged or refueled at buoy 506. The third UAV may then transport the payload to buoy 512, while the second UAV 114 is recharged or refueled at buoy 506. Such a process will continue until the payload is delivered to buoy 520 or another destination. Hence, by supporting two or more UAVs 114 concurrently, the buoy network is able to provide a relay system of UAVs 114 to more efficiently delivery a payload to any geographic location within the network (whether at a buoy or at another location with range of the buoy network). In some implementations, a UAV (or other delivery device) may recharge and/or refuel at a buoy and without transferring its payload to another UAB. This would advantageously simply the delivery process of items along the network from a source to a destination location.

Figure 6:
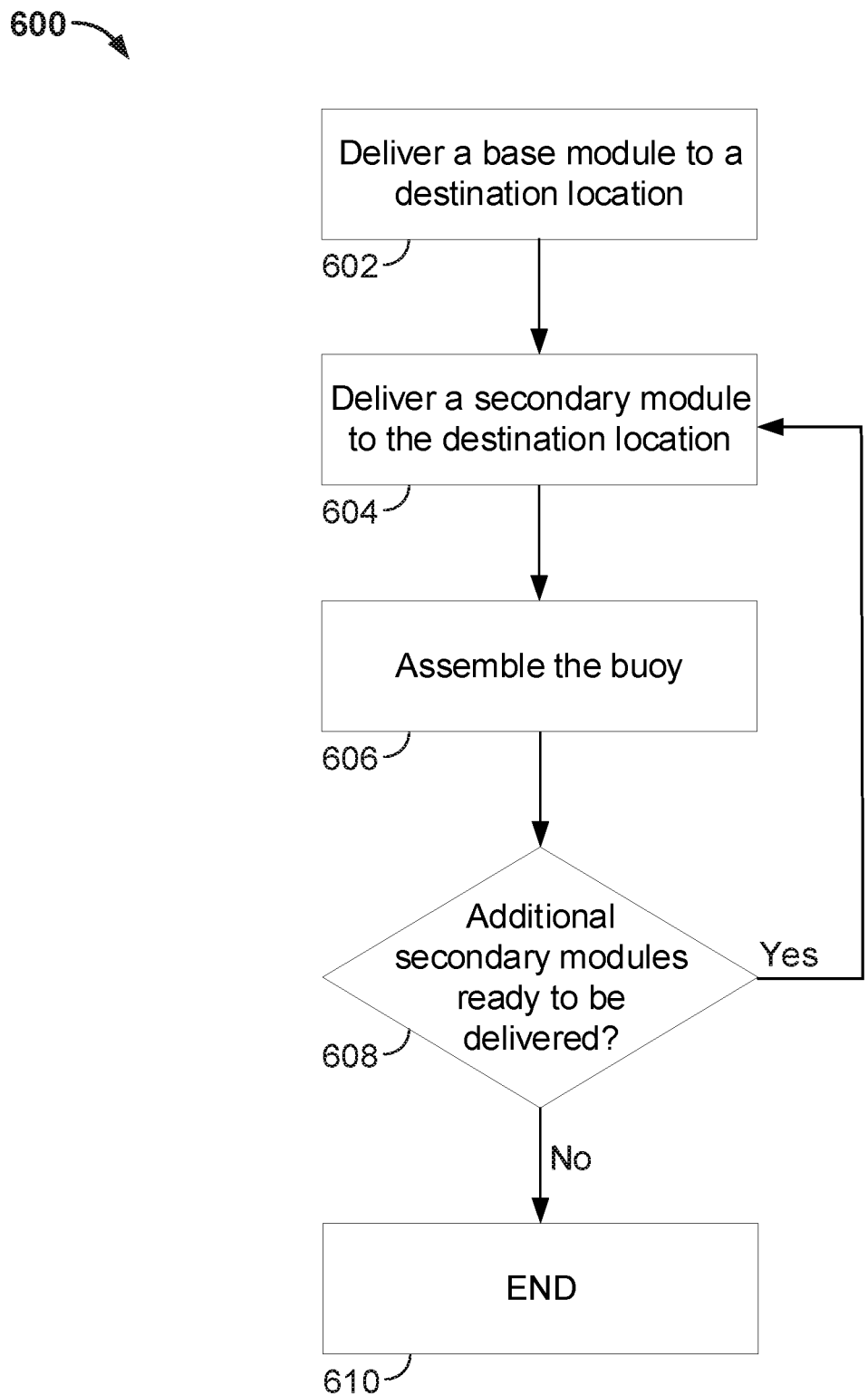
FIG. 6 is an exemplary process according to a method of efficiently deploying a buoy.

FIG. 6 is an exemplary process 600 for efficiently deploying a buoy 300. Process 600 begins by delivering a base module to a destination location (Step 602). For example, a base element of housing 102 (e.g. 102*d* of FIG. 3) may be delivered first by a first UAV 114.

Process 600 continues by delivering a secondary module to the destination location (Step 604). For example, a second portion of housing 102 (e.g., 102*c*) may be delivered to the destination.

Process 600 continues by assembling the buoy 300 (Step 606). For example, housing module 102*d* may include a sensor (proximity and/or contact) that detects the presence of module 102*c*. The housing module 102*d* may include an assembler 220, connected to the housing module 102*d* that engages the module 102*c* with the module 102*d*. Module 102*c* may, in turn, include an assembler 220 engagement mechanism that engages module 102*b* with module 102*c* when detected.

Process 600 continues by determining whether additional secondary modules are ready to be delivered (Step 608). For example, a third portion (e.g., 102*b* of FIG. 3) and a fourth portion (e.g., 102*a* of FIG. 3) may be ready to be delivered to the destination location. If additional secondary modules are waiting to be delivered, process 600 continues at Step 604. Otherwise, buoy 300 is completely assembled and process 600 ends (Step 610).

While the examples herein describe systems and methods in relation to buoys and buoy networks, the techniques described herein may be applied to equally land or space based transport networks, including UAV terminal networks over land, operating with or without a buoy network. For example, a land-based UAV terminal network may be deployed between Anchorage, Ak. and Eagle, Ak. (a remote town). The network of UAV terminals may enable efficient delivery of payloads (e.g., U.S. mail) to and from Eagle, Ak. while minimizing the risk of manned flights. As another example, a buoy network may enable delivery and return of payloads between Fort Randall, Ak. and Attu, Ak. on Attu Island in the Bering Sea.

It will be apparent to those of ordinary skill in the art that methods involved in the systems and methods of the invention may be embodied in a computer program product that includes a non-transitory computer usable and/or readable medium. For example, such a computer usable medium may consist of a read only memory device, such as a CD ROM disk, conventional ROM devices, or a random access memory, a hard drive device or a computer diskette, a flash memory, a DVD, or any like digital memory medium, having a computer readable program code stored thereon.

Optionally, the system may include an inertial navigation system, a Doppler sensor, an altimeter, a gimbling system to fixate the sensor on a populated portion of a holographic map, a global positioning system (GPS), a long baseline (LBL) navigation system, an ultrashort baseline (USBL) navigation, or any other suitable navigation system.

It will be apparent to those skilled in the art that such aspects are provided by way of example only. It should be understood that numerous variations, alternatives, changes, and substitutions may be employed by those skilled in the art in practicing the invention.

Accordingly, it will be understood that the invention is not to be limited to the aspects disclosed herein, but is to be understood from the following claims, which are to be interpreted as broadly as allowed under the law.

What is claimed is:

1. A mooring system comprising:
a plurality of connected buoyancy elements being positively buoyant on a water surface and being negatively buoyant at a depth below the water surface; and
a trigger mechanism arranged to reduce the buoyancy of a portion of the buoyancy elements from being positively buoyant to negatively buoyant to cause the portion of the connected buoyancy elements to sink below the water surface, wherein the trigger mechanism changes the buoyance of the portion of the connected buoyancy elements by either adding or removing a mooring element to an end of the connected buoyancy elements;
wherein the plurality of connected buoyancy elements are connected via a tethering line; and
wherein the trigger mechanism includes the mooring element when the mooring element is attached to a free end of the tethering line adjacent to one of the plurality of connected buoyance elements.

2. The system of claim 1, wherein at least one of plurality of connected buoyancy elements includes a bladder.

3. The system of claim 2, wherein a bladder is less than or equal to about 0.5 Kg, 1 Kg, 1.5 Kg, 2 Kg, 5 Kg, and 10 Kg.

4. The system of claim 1, wherein the mooring element includes a material having a density greater than a surrounding water body.

5. The system of claim 4, wherein the mooring element is less than or equal to about 0.5 Kg, 1 Kg, 1.5 Kg, 2 Kg, 5 Kg, 10 Kg, 50 Kg, 100 Kg, and 1000 Kg.

6. The system of claim 1, wherein a weight of the mooring element, when attached to the adjacent buoyancy element, pulls the tethering line downward towards the bottom of a surrounding water body, causing the adjacent buoyancy element to sink downward, increasing the surrounding pressure on the adjacent buoyancy element, and causing a bladder of the adjacent buoyancy element to collapse in response to the surrounding pressure and increase the adjacent buoyancy element's density and, thereby, change a state of the adjacent buoyancy element from a state of positive buoyancy to a state of negative buoyancy.

7. The system of claim 6, wherein the trigger mechanism creates a chain reaction of negative buoyance as each buoyancy element of the plurality of connected buoyancy elements along the tethering line is pulled downward and becomes negatively buoyant.

8. A mooring system comprising:
a plurality of connected buoyancy elements being positively buoyant on a water surface and being negatively buoyant at a depth below the water surface; and
a trigger mechanism arranged to reduce the buoyancy of a portion of the buoyancy elements from being positively buoyant to negatively buoyant to cause the portion of the connected buoyancy elements to sink below the water surface, wherein the trigger mechanism changes the buoyance of the portion of the connected buoyancy elements by either adding or removing a mooring element to an end of the connected buoyancy elements;
wherein a weight of least one of the plurality of connected buoyancy elements and a tethering line, while being in a state of positive buoyancy, are sufficiently light to enable delivery via one or more UAVs.

9. A method for deploying a mooring system comprising:
delivering a plurality of connected buoyancy elements to a body of water, the plurality of connected buoyancy elements being positively buoyant on a surface of the body of water and being negatively buoyant at a depth below the surface;
connecting the plurality of connected buoyancy elements via a tethering line;
activating a trigger mechanism arranged to reduce the buoyancy of a portion of the buoyancy elements from a being positively buoyant to negatively buoyant to cause the portion of the connected buoyancy elements to sink below the water surface, wherein the trigger mechanism changes the buoyance of the portion of the connected buoyancy elements by either adding or removing a mooring element to an end of the connected buoyancy elements; and
activating the trigger mechanism by attaching the mooring element to a free end of the tethering line adjacent to one of the plurality of connected buoyance elements.

10. The method of claim 9, wherein at least one of plurality of connected buoyancy elements includes a bladder.

11. The method of claim 10, wherein a bladder is less than or equal to about 0.5 Kg, 1 Kg, 1.5 Kg, 2 Kg, 5 Kg, and 10 Kg.

12. The method of claim 9, wherein the mooring element includes a material having a density greater than a surrounding water body.

13. The method of claim 12, wherein the mooring element is less than or equal to about 0.5 Kg, 1 Kg, 1.5 Kg, 2 Kg, 5 Kg, 10 Kg, 50 Kg, 100 Kg, and 1000 Kg.

14. The method of claim 9 comprising:
adding a weight of the mooring element to the adjacent buoyancy element to pull the tethering line downward towards the bottom of the surrounding water body,
causing the adjacent buoyancy element to sink downward,
increasing the surrounding pressure on the adjacent buoyancy element as the buoyancy element sinks downward, and
causing a bladder of the adjacent buoyancy element to collapse in response to the surrounding pressure to increase the adjacent buoyancy element's density and, thereby, change a state of the adjacent buoyancy element from a state of positive buoyancy to a state of negative buoyancy.

15. The method of claim 14 comprising creating a chain reaction of negative buoyance as each buoyancy element of the plurality of connected buoyancy elements along the tethering line is pulled downward and becomes negatively buoyant.

16. A method for deploying a mooring system comprising:
delivering a plurality of connected buoyancy elements to a body of water, the plurality of connected buoyancy elements being positively buoyant on a surface of the body of water and being negatively buoyant at a depth below the surface; and
activating a trigger mechanism arranged to reduce the buoyancy of a portion of the buoyancy elements from a being positively buoyant to negatively buoyant to cause the portion of the connected buoyancy elements to sink below the water surface, wherein the trigger mechanism changes the buoyance of the portion of the connected buoyancy elements by either adding or removing a mooring element to an end of the connected buoyancy elements;

wherein a weight of least one of the plurality of connected buoyancy elements and a tethering line, while being in a state of positive buoyancy, are sufficiently light to enable delivery via one or more UAVs.

* * * * *